Reissued Apr. 21, 1925. Re. 16,048

UNITED STATES PATENT OFFICE.

HERBERT HAMILTON SCOTT AND GEORGE McINTOSH SCOTT, OF LONDON, ENGLAND.

PRODUCTION OF SHOW CARDS, ADVERTISEMENTS, SIGNS, DECORATIONS, OR THE LIKE BY STENCILING.

No Drawing. Original No. 1,516,065, dated November 18, 1924, Serial No. 627,932, filed March 26, 1923. Application for reissue filed March 12, 1925. Serial No. 15,122.

*To all whom it may concern:*

Be it known that HERBERT HAMILTON SCOTT and GEORGE McINTOSH SCOTT, subjects of the King of Great Britain, residing at 45 Kingsway, London, W. C. 2, England, have invented certain new and useful Improvements Relating to the Production of Show Cards, Advertisements, Signs, Decorations, or the like by Stenciling, of which the following is a specification.

This invention relates to the production of showcards, advertisements, signs, decorations or other decorative articles by stenciling, the chief object being to enable vitreous enamel metal signs and the like to be manufactured commercially in large numbers in a rapid, inexpensive and simple manner.

Hitherto the commercial production of vitreous enamel metal signs, particularly signs with complicated or multi-colored designs or lettering thereon, has been limited owing to the many operations and great labor and expense involved in the method of production hitherto employed. The drawback and limitations to printing methods with the aid of a litho-stone or zinc plate, the aerographing method, and the "brushing out" method are well known in the trade.

According to the present invention vitreous enamel metal signs or other decorative articles are produced by preparing a vitreous enameling composition or paint of suitable consistency and drying characteristics, applying the composition to a vitreous surface to be decorated by means of a screen or stencil of silk or other meshed material having permeable and impermeable portions, and finally heating the article so treated to a temperature sufficient to cause fusion of the vitreous composition. In the preparation of the paint or composition finely ground quartz-like enamel or "enamel frit" is used as the body or base which is colored as required by means of the powdered enameling oxides of commerce and worked up to a suitable consistency to pass through the meshes of the stencil employed.

The fineness of the powdered materials should be as great as is necessary to enable the composition to pass through the meshes of the stencil and the materials should therefore be capable in their dry unmixed state of passing through a screen of slightly finer mesh. We have found that a fineness of powder corresponding to two hundred meshes to the square inch gives satisfactory results. The stencil used with such powder would have about 130 to 140 meshes to the square inch, but the fineness of powder used depends to some extent on the amount of detail to be shown on the metal sign.

In working up the powdered quartz-like enamel or "enamel frit" and oxide mixture into a suitable pasty mass a liquid must be used that will not permit of too rapid drying and yet can eventually be dried completely without causing the surface to be spoilt by bubbles or otherwise when the article is subjected to the "enamel fusing" temperature. We have found that liquid of an oily character should be used. For example we have found that a mixture composed of one part by volume of turpentine, 1 part by volume of beeswax, and 8 parts by volume of paraffin oil gives excellent results. This oily mixture is taken and mixed with approximately three times its weight of the quartz-like enamel or "enamel frit" and oxide mixture and the whole is ground in a mill after which a small proportion of a varnish such as lithovarnish amounting for example to one to two per cent of the aforesaid oily mixture is well mixed in. The proportion of the colored oxide to quartz-like enamel or frit depends on the quality and nature of the oxide and generally speaking varies from 4 to 20 per cent. The pasty composition is effectively and simply applied by pressing it through the meshes of the stencil by means of a squeegee. After stenciling the vitreous enamel metal sheets as above described we may first heat them sufficiently to dry out the oily medium and then heat them in a muffle furnace or otherwise to a temperature sufficiently high to cause fusion of the vitreous enamel background with the vitreous composition applied through the stencil, for example from say about 600° to 1000° C. depending upon the nature of the composition. We thereby obtain real vitreous enamel sheet metal advertising signs or the like.

In carrying out our process particular attention is directed to the cooperative effect between the vitreous paste with oily medium and the permeable mesh portion of the stencil. In being pressed through the mesh, the vitreous paste is divided up into numerous small particles and so deposited on the enamel base, and remains thus divided to enable the volatile matter to readily pass off. Upon being subjected to heat, all the ingredients of the paste except the vitreous portion, are readily driven off at a temperature below that of the fusion point of the vitreous matter. As a result, when subjected to the fusing temperature, the vitreous particles of the paste are fused into a continuous smooth layer on the enamel base, and are not subjected to the action of volatile matter being driven off. Were the paste to be put on through a cut stencil having ties and without any mesh, it could not be evenly applied, and furthermore, upon being subjected to heat, the volatile matters in the paste could not be so readily driven off since the paste would not be in a finely divided state due to passage through stencil meshes. As a result the finished product would be rough and uneven, due both to the imperfect application, and to the driving off of volatile substances during the fusion of the vitreous material.

By passing the vitreous paste through a mesh stencil, the mesh of the stencil so modifies the condition of the paste as deposited on the base that the stenciled plate can be fired to produce a smooth, even, and highly glazed product.

In producing many designs a cut stencil having ties cannot be employed, but it is necessary to use a mesh stencil. With a mesh stencil, however, dry vitreous material cannot be dusted through the mesh. There was a problem to be solved in getting the ground vitreous enamel through a mesh stencil in a satisfactory manner for design purposes. As pointed out, the vehicle or carrier with which the vitreous enamel is mixed had to be a substance which would enable the vitreous enamel to be readily passed through the mesh and not dry out too rapidly or clog the mesh, because the mesh stencil for practical operation must be used a number of times without having to be cleaned. We found that oils would enable the vitreous enamel to be passed through the mesh without clogging; but the presence of any oil or grease in vitreous enamel has been regarded as fatal to the production of a perfect vitreous enamel surface, because the products of combustion from such oil or grease passing through the enamel, when fused caused blisters or pitting, so much so that in vitreous enamel factories great care has always been exercised in keeping oil or grease from accidentally getting into the vitreous enamel "frit." We further found, however, that if the vitreous enamel composition with oily medium was mixed to a pasty consistency and passed through the mesh, the paste would be applied to the surface in small separated particles as stated, which will not "run" together, thus enabling the volatile matter to pass off freely without blistering the enamel.

We have thus provided a volatilizable pasty medium for the particles of vitreous material and thus made possible the use of a mesh stencil with a vitreous enamel. Further, the action of the mesh of the stencil on the vitreous paste results in depositing the paste on the base in a condition such that heating of the product will drive off the medium portion of the paste and leave only the vitreous particles when the fusing temperature has been reached. Thus the medium portion of the paste permits use of a mesh stencil for vitreous enamel work, and the action of the mesh on the paste permits firing of the product so that very satisfactory results are attained.

The manufacture of vitreous enamel signs consisting of metal plates having a vitreous enamel surface and the lettering or designs impressed thereon by means of vitreous enamel compositions and fused into the enameled surface in accordance with the present invention constitutes an important development in the art and enables vitreous enamel metal signs and the like whether simple or intricate to be manufactured rapidly and relatively cheaply in large numbers. One distinct advantage is in the case of multicolored designs, because each color can be applied and quickly dried ready for the application of the next color, the actual fusing of the colors if they do not overlap being carried out in a single final fusing operation. With some vitreous enamels if it were attempted to fire the article to enamel fusing temperature, after the application of each color of a three of more color design, the enamel would be over fired and deteriorated. According to our process, the stencils last a considerable time before becoming defective through wear and no technical skill or special plant such as is required for lithograph work is necessary in using the stencils.

Vitreous enamel metal signs and the like manufactured in accordance with our invention are as durable as ordinary enamel ware and will withstand rough usage and weather changes for a great length of time without deterioration.

What we claim is:

1. Method of producing designs upon a vitreous surface which comprises taking a pasty vitrefiable enamel composition containing finely ground vitrefiable enamel and an oily carrier and capable of being applied to a surface in subdivided form by being pressed through a fine mesh and of retaining a subdivided form upon said surface until heated, placing a fine mesh stencil onto the vitreous surface and forcing said composition through the mesh portion of the stencil onto the vitreous surface, whereby the composition will be applied to the design portion of the surface in subdivided form and finally heating the article to an enamel-fusing temperature.

2. Method of producing designs upon a vitreous surface which comprises placing a fine mesh stencil onto the vitreous surface and taking a pasty composition containing a finely ground enamel "frit" and an oily carrier and forcing said composition through the mesh portion of the stencil onto the vitreous surface, whereby the composition will be applied to the design portion of the surface in subdivided form, and finally heating the article to an enamel-fusing temperature.

3. Method of producing multi-colored vitreous enamel designs and other decorative articles which comprises successively applying component parts of a design of different colors to a vitreous enamel surface by successively placing onto the vitreous enamel surface a mesh stencil for each component color of the design, forcing through the mesh portion of each stencil a pasty composition containing finely ground vitreous enamel frit and an oily carrier and of desired color, and between successive applications of such composition to the surface, drying the component of the design thus applied, at a temperature insufficient to fuse the enamel of the composition, and finally heating to an enamel-fusing temperature the article bearing the multi-colored design.

In testimony whereof we have signed our names to this specification.

HERBERT HAMILTON SCOTT.
GEORGE McINTOSH SCOTT.